United States Patent [19]

Clevett et al.

[11] 4,446,854
[45] May 8, 1984

[54] SOLAR OVEN

[76] Inventors: Merton L. Clevett; Mildred L. Clevett, both of 6121 S. Logan Ct., Littleton, Colo. 80121

[21] Appl. No.: 285,064

[22] Filed: Jul. 20, 1981

[51] Int. Cl.$^3$ ............................................. F24J 3/02
[52] U.S. Cl. .................................... 126/451; 126/438; 126/424
[58] Field of Search ............... 126/451, 438, 450, 417, 126/424, 425; 248/349, 133

[56] References Cited

U.S. PATENT DOCUMENTS

| 3,156,234 | 11/1964 | Steinberg | 126/451 |
|---|---|---|---|
| 3,236,227 | 2/1966 | Steinberg | 126/451 |
| 3,391,688 | 7/1968 | Dery | 126/451 |
| 3,720,197 | 3/1973 | Schroth | 126/451 |
| 3,896,786 | 7/1975 | Clevett | 126/438 |
| 4,003,363 | 1/1977 | Grossman | 126/450 |
| 4,069,812 | 1/1978 | O'Neill | 126/438 |
| 4,077,391 | 3/1978 | Way, Jr. | 126/451 |
| 4,130,106 | 12/1978 | Clevett et al. | 126/438 |
| 4,268,332 | 5/1981 | Winders | 126/438 |
| 4,366,808 | 1/1983 | Nash | 126/450 |
| 4,378,790 | 4/1983 | Erwin | 126/438 |

OTHER PUBLICATIONS

Edmond Scientific Catalog 1981 Fall/Winter 8210 pp. 3-12.

Primary Examiner—James C. Yeung
Attorney, Agent, or Firm—Kyle W. Rost

[57] ABSTRACT

A hemispherical oven body is formed from two concentric, spaced apart hemispherical shells having thermal insulation between and with spacing maintained by thermally insulating spacers in a triangular array. A single elongated fastener through the center point of each shell holds the shells together and provides a sighting point for aiming the oven at the sun. The shell edges at the oven face are closed by a resilient seal ring that extends above the shell edges and contacts a cover disk of glazing material. Combination hinge/handles are located at diametrically opposite sides of the cover disk, and a hinge pin on an edge of the oven body engages one of the handle/hinges. A reflector panel assembly includes a closed geometric figure formed by hinge rods connected at opposite ends to common anchors, which connect the hinge rods to the cover disk. The reflector panels pivot on the hinge rods to fold against the cover disk. A cross member formed from intersecting rods holds the reflector panels in operative position and cooperates with the fastener between the shells in providing a sighting aid for aiming the oven. A frusto-conical base supports the oven body for gimballed aiming and is sized to fit inside the oven cavity for storage.

12 Claims, 7 Drawing Figures

SOLAR OVEN

BACKGROUND OF THE INVENTION

1. Field of the Invention

The invention relates to stoves and furnaces. More specifically, the invention relates to solar powered ovens having gimballed mounts and self-aligned level cooking surface.

2. Description of the Prior Art

Solar stoves and ovens are known to employ reflectors to increase the solar energy gathered by the oven. Such art is taught in U.S. Pat. Nos. 3,106,201 to Steinberg; 3,025,851 also to Steinberg; and 4,130,106 to Clevett. One problem with such ovens is that the oven is not level but must tilt in order to aim at the sun for best efficiency. Thus, the food inside the oven has generally been on an angle. It has been proposed to use cooking bags as one solution to this problem.

Because solar powered ovens do not require a consumed fuel supply, it is desirable to have portable, compact ovens. Previously, portable ovens have offered only limited ability to be accurately aimed at the sun, such as by a handle that converts to a base and requires loosening of a knob to permit re-aiming. The above noted patents to Steinberg teach such aiming devices. However, the sun is constantly shifting it position with respect to an oven resting on the earth, and the sun may move both with respect to elevation and azimuth. Simple supporting mounts that require movement on horizontal and vertical axes in separate adjustments are inconvenient to use for tracking such solar movements.

Still another problem with solar ovens is that most have been vulnerable to disruption by modest winds, since large reflectors and box-like bodies are often used. Thus, a streamlined configuration has been desired.

The above problems are resolved as will be explained below.

SUMMARY OF THE INVENTION

A solar oven having a hemispherical body and circular face defines an interior oven cavity of hemispherical contour that permits cooking containers to be placed in level position regardless of the tilt required to aim the oven face directly at the sun. The oven face is covered by a disk shaped cover assembly having combination handles and hinges at opposite diametric edge positions, and the oven body has a hinge pin engageable with either of the handle/hinges for retaining the cover on the oven body face through all positions of tilt. The cover carries a plurality of reflector panels foldably mounted on a hinge rod assembly, wherein each panel is pivotally attached to a hinge rod, and the hinge rods are joined to anchors that are attached to the disk shaped cover. The panels are centrally foldable against the cover for storage, but in operation the panels are supported in unfolded position by cross members having a central intersection that serves as a solar alignment sighting aid by casting a shadow on the oven body.

A frusto-conical base supports the oven in gimballed relationship for immediate aiming of the oven at the sun along any axis. The base is sized to be received entirely within the oven cavity for storage.

The oven body may be formed from a pair of concentric hemispherical shells spaced apart and containing thermal insulation between the shells. The edges of the shells at the oven face may be closed by a resilient sealing ring that extends above the shell edges to contact the cover disk and seal against it. The cover disk, which constitutes an oven window, is hinged to the oven body. The spacing between the shells is maintained by insulating spacers in a triangular pattern and equidistant from the center point of each shell, and an elongated fastener such as a single bolt through the center point of the shells secures the shells against separation. A radial lip may close a portion of the gap between shell edges. Alternatively, the oven body may be formed from a monolithic insulating material in hemispherical shape, or the insulation may be a pre-formed hemispherical mass. The streamlined configuration of the hemispherical body so formed is resistant to wind disruption.

A main object of the invention is to create a solar oven capable of maintaining cooking pans in a level position while enabling the oven to be tilted on any axis for rapid alignment with the sun.

Another object to to provide a thermally insulated oven capable of maintaining its inner liner well insulated from the outer surface of the oven body.

A further object is to create an oven that is self-contained with modularized components for simplified assembly and disassembly.

DESCRIPTION OF THE PREFERRED EMBODIMENT

Figure 1:
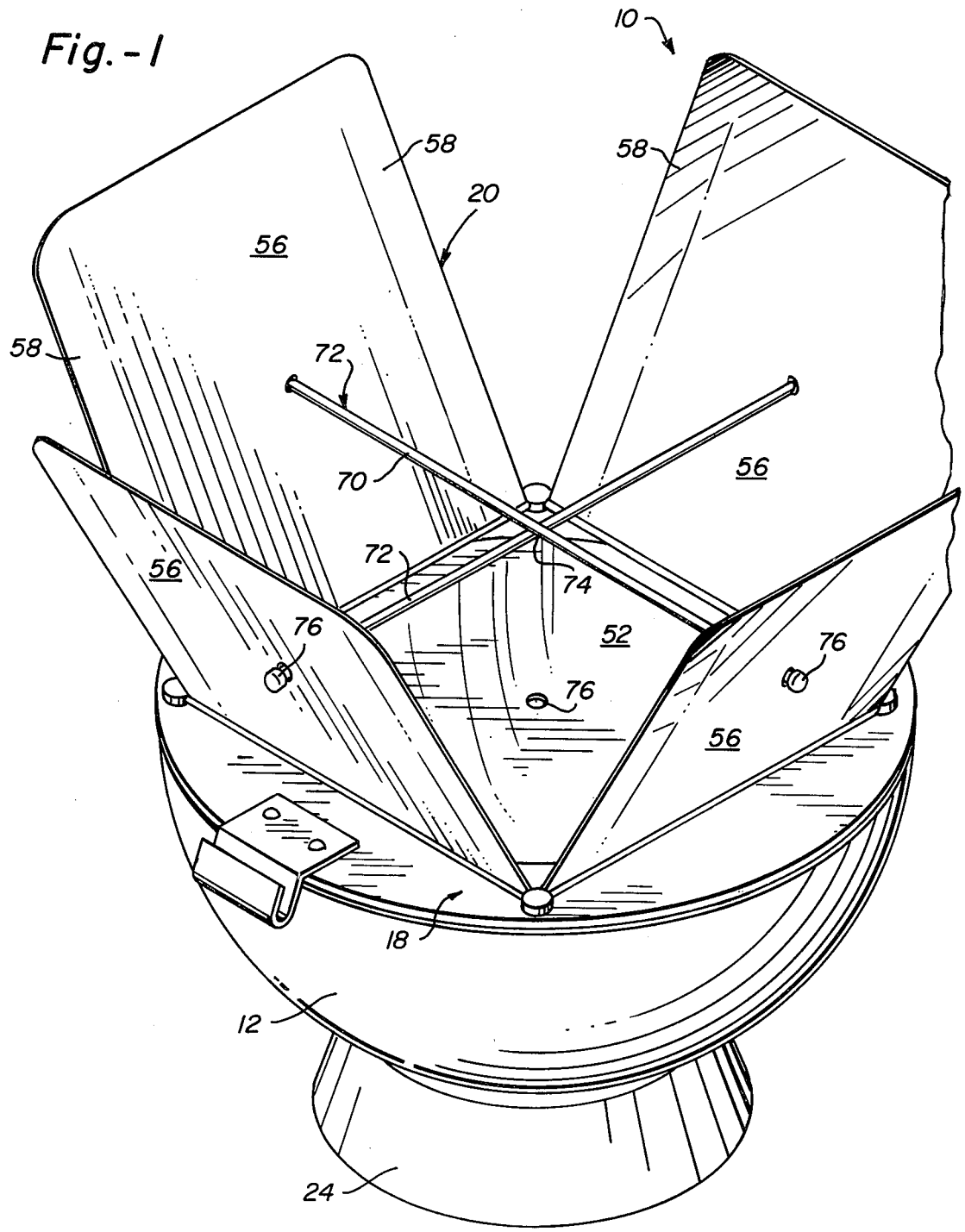
FIG. 1 is an isometric view of the oven in operative position.
Figure 2:
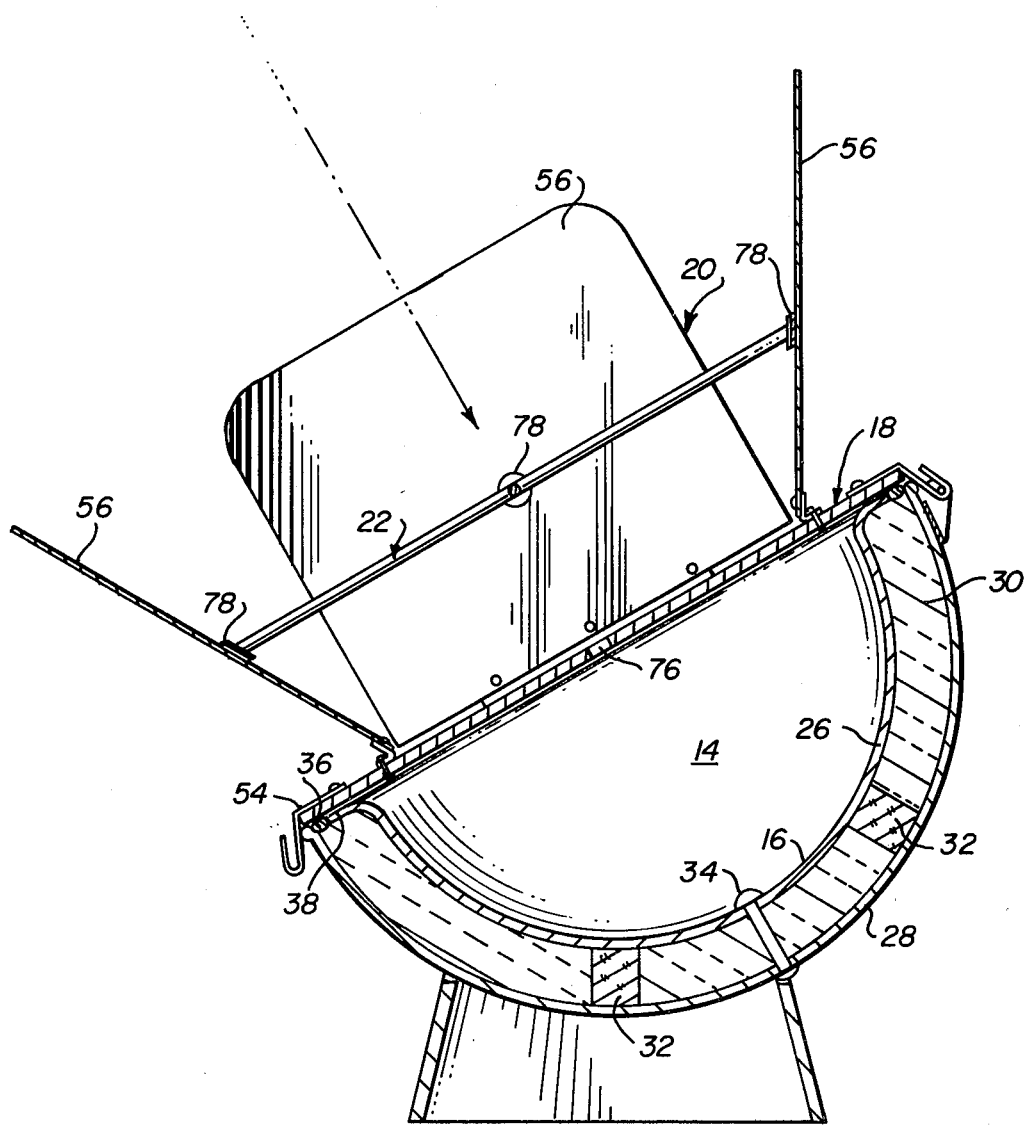
FIG. 2 is a vertical cross-sectional view through the oven of FIG. 1.
Figure 3:
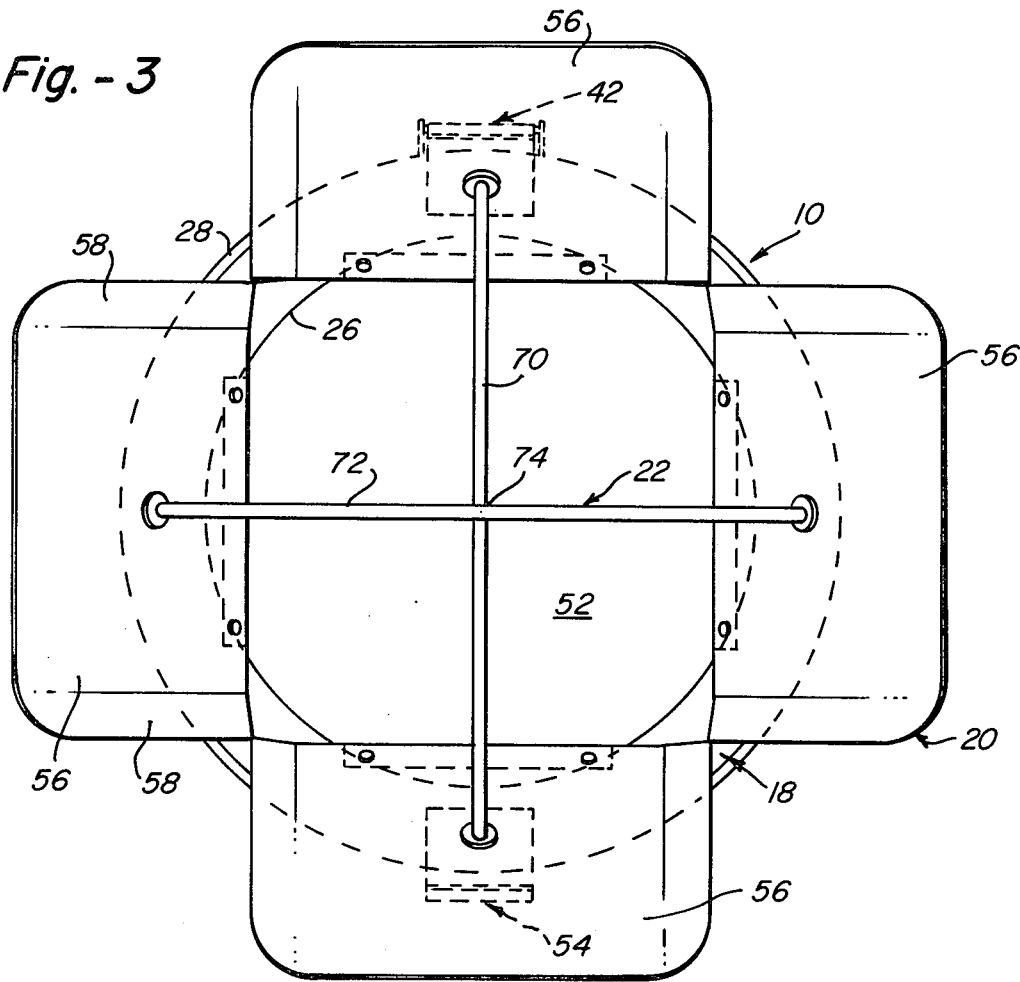
FIG. 3 is a top plan view of the oven.

As shown in FIGS. 1 and 2, the solar powered oven 10 is provided with a generally hemispherical oven body 12 defining an interior cooking cavity 14 opening to the non-hemispherical face of the oven body. Cavity 14 is defined by an interior supporting surface 16 hemispherical in shape and adapted to support a cooking container such as a pan in an acceptably level or almost level position despite the non-horizontal positioning of the oven face. A cover assembly 18 serves as the oven window and is constructed of a solar radiation permeable material such as transparent glass or transparent, heat-resistant plastic. The oven window substantially covers or closes the oven body face. Means are provided to attach the cover assembly or oven window to the oven body so that the oven window will remain in place despite tipping of the oven body face. Reflector means 20 direct solar radiation against and through the cover assembly 18. An optical alignment indicating means 22 may also serve as a structural support for the reflector means and provides a sighting instrument for placing the face of the oven directly perpendicular to the sun's rays. Optionally, the oven body may be supported on a base means 24 in gimballed, ball and socket relationship to permit the oven body to be readily aimed toward the sun.

As best shown in FIG. 2, the oven body may be formed from an inner shell 26 and an outer shell 28, both of which are hemispherical, although the inner shell is of smaller diameter and defines the inner supporting surface 16, which is dark in color for converting solar radiation into heat and which is hemispherical for supporting a cooking container on a stable base against the hemispherical surface 16 through a large degree of tipping imparted to the oven body, as may be necessary to maintain the oven body in accurate aim toward the sun. Therefore, the oven body permits the cooking container to substantially self-aligning on whatever portion of the surface 16 is approximately at the bottom of the body.

The outer shell 28 employs the hemispherical shape to permit the oven body to be supported at the required angle of tilt for alignment with the sun. The inner and outer shells are spaced apart to provide room for insulating material such as fiberglass to be placed between the shells. The spacing may be maintained by thermally isolating spacer means such as cork bodies 32. At least three such spacers are desired to support the shells in mutually concentric relationship. The preferred position of the spacers is below the edge of the oven face by an arc of approximately sixty degrees, with the spacers being equidistant from each other. A fastener means such as the single bolt 34 biases the shells toward each other and against the spacers. Other types of elongated fasteners could be used, such as rivits. When the two shells, three spacers, and insulation have been assembled, the spacers are maintained in their desired places by the pressure of the shells under force of the bolt 34 and by the insulation. Additionally, fasteners may be inserted through one or both shells and into the spacers for improved certainty of position. When a single fastener 34 is employed, it is preferred to be through the central point of both hemispheres so that its head marks the center of the oven surface 16 and serves as a sighting aid for aiming the oven at the sun. The three spacers should be equidistant from the fastener and from the center point of the hemispheres.

The edges of the shells at the face of the oven may be closed by a resilient ring 36 formed from a material such as silicon rubber. A radially extending lip 38 may partially close the gap between the shell edges, permitting the resilient ring 36 to be quite narrow, such as one-quarter inch in radial dimension. Ring 36 may serve the additional purpose of providing a seat or contact surface for the cover assembly and for this purpose may extend outwardly from the gap between the inner and outer shells. Although it is preferred to have the shell edges lying substantially in a single plane so that the full insulating properties of the oven body are extended to the cover assembly, if one shell edge is in a different plane, the ring 36 and cover assembly 18 may be adapted to nevertheless create the desired sealing contact. Lip 38 may be formed at the edge of either or both hemispheres, such as by spin forming during manufacture of the shells.

Base means 24 may receive the oven body in a ball-and-socket relationship wherein the hemispherical shape of the outer shell serves as the ball portion and the base defines an edge around a recessed area serving as the socket. Ordinarily less than a 180 degree arc of the oven body is received in the base. A preferred base means 24 is in the shape of a frustum cone resting upon its broader end and receiving the oven body upon its narrower end. The major diameter of the frustum cone is preferred to be smaller than the diameter of the inner shell 26, and the frustum cone may further have a minor diameter and height such that the base can fit entirely within the oven body in cavity 14 when in inverted position for storage.

Figure 4:
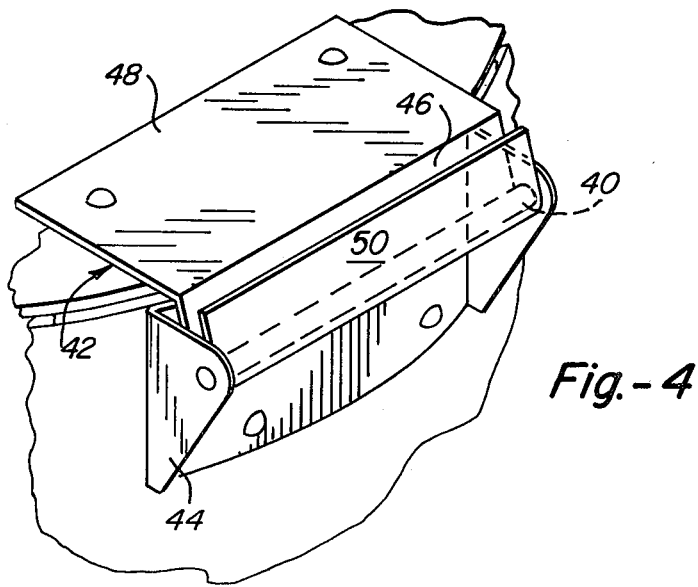
FIG. 4 is an enlarged isometric view of the hinge between the oven body and cover.

The attaching means between the cover assembly and the oven body is best shown in FIG. 4 to be a hinge pin 40 and a hinge means 42. The hinge pin is connected to the oven body by a suitable bracket 44 supporting the pin at a position spaced from the edge of the oven body, parallel to the plane of the oven face, and approximately perpendicular to a radius of the hemisphere directed through the pin. The hinge means 42 is preferred to be formed from a U-shaped hinge member having one wall 46 connected to the cover assembly, such as by fastening plate 48. The second wall 50 of the U-shaped hinge is spaced from wall 46 by a suitable gap to permit reception of the hinge pin 40 between the walls. Walls 46 and 50 depend from the plane of the cover assembly at an angle of sixty degrees or more to provide locking engagement with the hinge pin when the cover assembly is closed against the oven body. The cover assembly is pivoted on the hinge pin when the cover assembly is raised for access to the oven cavity.

The cover assembly includes a disk 52 having a diameter approximately the same as the outer shell 28. The hinge member is thus supported at the edge of the disk, which is at the side of the oven body. Diametrically opposite from the hinge member may be a handle means 54 intended for use in lifting the cover disk. The handle means 54 may be similar in construction to the U-shaped hinge member so that it is capable of engaging hinge pin 40 in substitution for hinge means 42. Thus, the cover disk may be attached to the hinge pin at either hinge means 42 or handle means 54.

The reflector means 20 provides a plurality of at least four reflector panels 56 arranged generally near the edge of the cover disk in a symmetrical pattern. When in operational position, each panel angles upwardly and outwardly from the oven body at an acute angle to an axis through the center point of the oven body. Each panel may be formed of metal or plastic sheet material and include a slightly folded marginal edge portion 58 to strengthen the panel.

The reflector panels may be centrally foldable for storage. Each panel is therefore supplied with a hinge along its lower edge. The preferred hinge is a hinge rod assembly 60 having a plurality of hinge pin rods 62 joined to anchor means 64 at each end of each rod and forming a closed geometric figure such as a rectangle or square. Each reflector panel is attached to a hinge pin rod for pivotal motion about the rod, such as by a hinge clip 66. The panels are foldable on the rods 62 toward the center of the hinge rod assembly. The height of each panel is therefore less than the perpendicular distance across the hinge rod assembly so that the panels can fold together within the perimeter of the rod assembly. The reflector panels and hinge rods are connected to the cover disk by the anchor means 64, assuring that the reflectors will be retained with the cover and, correspondingly, with the oven body through all repositionings that may be required to maintain the aim of the oven at the sun. Other types of hinges may be used, such as butterfly hinges.

Alignment of the oven face with the sun is indicated indirectly by the shadow cast from a cross member 22, which also serves as a structural member that maintains the reflector panels 56 in operative position. The cross member may be formed from two rods 70 and 72 having an intersection 74 at which the rods may be pivotally connected. The rods attach at their ends to the reflector panels and maintain the separation of opposite panels. In FIG. 1, the rods are shown to engage the panels in socketed arrangement with enlarged rod ends 76; while in FIG. 2 the rods are provided with releaseable hooked fasteners such as Velcro, having mating fasteners permanently connected to the reflector panel faces to form attachments 78. The intersection point 74 is substantially equidistant from the reflector panel faces and is directly over the central point of the oven body, with the result that the shadow of the intersection 74 will lie on the head of fastener 34 when the oven is perfectly aligned with the sun. Cover disk 52 may have a central hole 76 coaxial with the fastener head and intersection point to serve as an alternate sighting aid.

Figure 5:
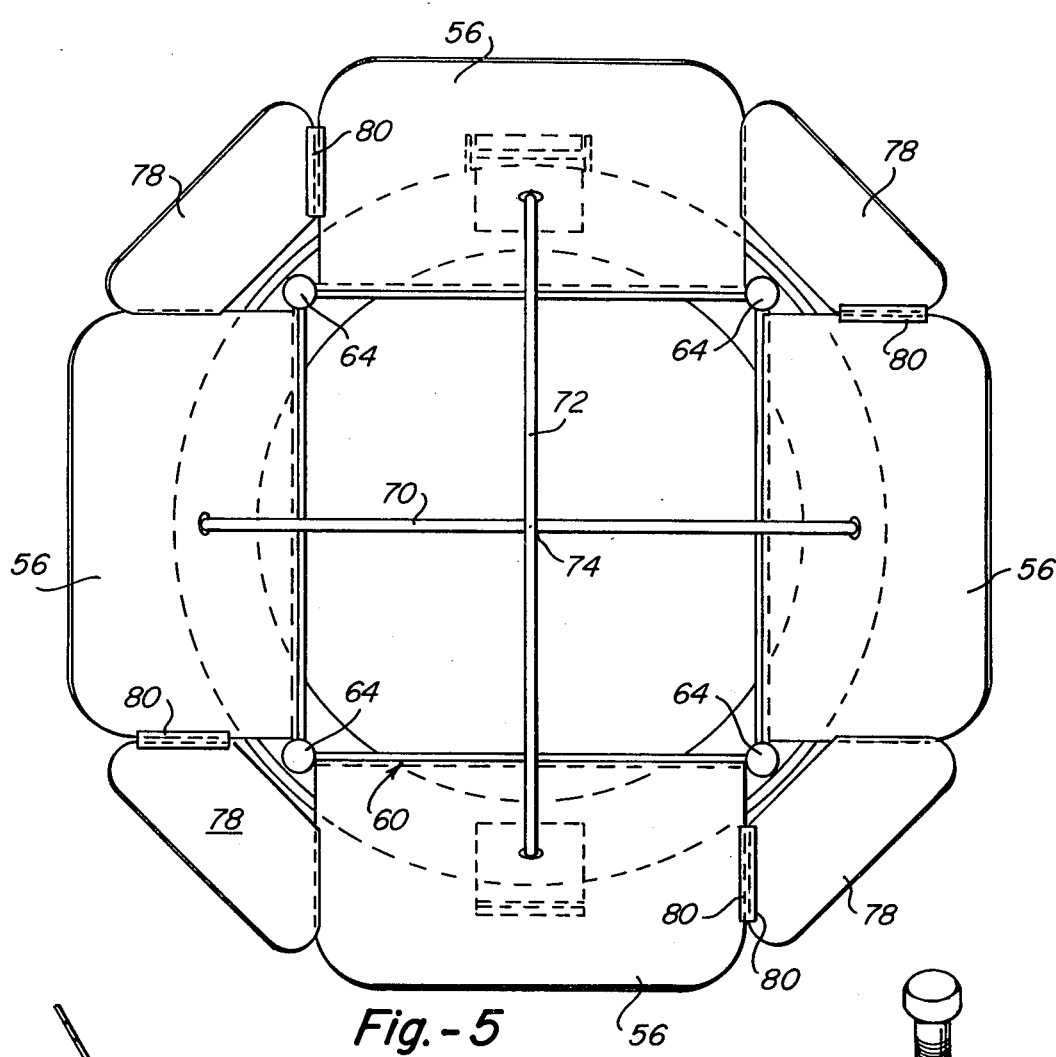
FIG. 5 is a top plan view of a modified embodiment of the oven.
Figure 6:
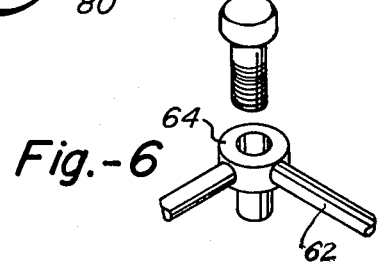
FIG. 6 is an enlarged isometric view of an anchor for the hinge rod assembly.
Figure 7:
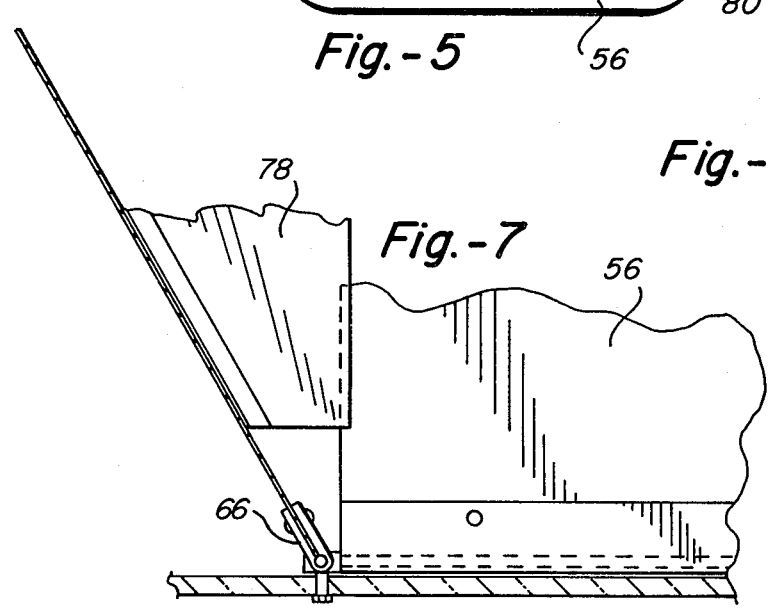
FIG. 7 is a fragmentary cross-section taken through the cover assembly and reflectors, showing the hinge rod assembly.

A further embodiment of the oven is shown in FIG. 5 wherein triangular reflector panels 78 occupy the corner areas between panels 56. These triangular panels may be attached to the primary, rectangular panels by releaseable fasteners such as Velcro strips 80 and/or durable tape hinges.

In operation, the oven is assembled by resting the oven body on the frusto-conical base, unfolding the reflector panels and securing them in place with the cross member, and aiming the oven face directly at the sun, as determined by the position of the cross member shadow on the disk cover or fastening bolt head. Most effective solar cooking will occur when the sun is relatively high in the sky, such as from mid-morning to mid-afternoon, during which times the oven will be expected to be tilted somewhat from a perfectly horizontal positioning of the oven window. Within a reasonable range of angles, a cooking container such as a pan can be placed in substantially level position on the oven's interior surface. Periodic realignment, such as every thirty minutes, is readily done by monitoring the shadow cast by cross-support intersection 74 with respect to the hole 76 or bolt head 34

Further optional embodiments of the oven provide for at least outer shell 28 to be constructed from ferrous material or to have ferrous material attached to it. Base 24 may be magnetic or have magnets attached to it. The oven body is positively held to the base and is capable of a potentially greater degree of tilt with respect to the base than might be achieved without magnetic interaction. Another embodiment of the oven body may include a precast hemisphere of insulating material replacing the fiberglass insulation, or the entire oven body may be cast or molded monolithic insulating lightweight concrete or heat resistant plastic foam in a hemispherical shape and with a metallic hemispherical liner. Still another embodiment may employ a base wherein the conical frustum is mounted on a pedestal base to elevate the oven to a convenient height, wherein such pedestal base also stores inside the oven body.

The above examples have been provided to explain the best presently known embodiments of the oven. The scope of the invention is intended to include a range of similar embodiments and therefore should be limited only by the following claims.

We claim:
1. A solar powered oven, comprising:
   (a) a generally hemispherical oven body assembly having inner and outer hemispherical shells, said inner shell defining an interior supporting surface for, in use, carrying a cooking container, said outer hemispherical shell substantially concentric spaced from said inner shell;
   (b) a cover assembly of solar radiation permeable material;
   (c) means for releasably attaching said cover assembly to said oven body over the non-hemispheric face thereof;
   (d) reflector means for directing solar radiation through said cover assembly;
   (e) means for indicating alignment of the oven face with a source of solar radiation; and
   (f) further comprising thermally isolating spacer means for separating and spacing said outer hemispheric shells from said inner hemispherical shell and aligning the shells in substantially concentric relationship, wherein said spacer means comprises a plurality of at least three cork bodies located at spaced apart locations between said hemispheric shells.

2. The solar powered oven of claim 1, further comprising an elongated fastener means engaging said inner and outer shells for urging said shells mutually against said spacer means.

3. The solar powered oven of claim 2, wherein said fastener means engages both of said shells substantially at the central point of each hemispheric shell.

4. The solar powered oven of claim 3, wherein said fastener means comprises a single bolt.

5. The solar powered oven of claim 3, wherein said spacer means comprises a plurality of at least three spacer bodies arranged substantially equidistant from each other and from said central point of each hemispheric shell.

6. The solar powered oven of claim 5, wherein each of said spacer bodies is separated from the edge of said hemispheric shells by an arc of shell wall of approximately sixty degrees.

7. A solar powered oven, comprising:
   (a) a generally hemispherical oven body assembly defining an interior supporting surface for, in use, carrying a cooking container;
   (b) a cover assembly of solar radiation permeable material;
   (c) means for releasably attaching said cover assembly to said oven body over the non-hemispheric face thereof;
   (d) reflector means for directing solar radiation through said cover assembly;
   (e) means for indicating alignment of the oven face with a source of solar radiation; and
   (f) wherein said cover attaching means comprises:
      (1) a hinge pin spaced radially from the edge of said oven body, oriented substantially parallel to the plane of the oven face and approximately perpendicular to a radius of the hemispherical oven body passing therethrough;
      (2) bracket means mounting said hinge pin to the oven body; and
      (3) a U-shaped hinge means having one wall thereof connected to said cover assembly and adapted to receive said hinge pin through the open top thereof for pivotal motion on the hinge pin.

8. The solar powered oven of claim 7, wherein said base means comprises a frusto-conical support having a major diameter smaller than the interior diameter of said hemispherical oven body and having a height and minor diameter such that the support fits substantially entirely inside the oven body for storage.

9. The solar powered oven of claim 7, wherein said cover assembly comprises a disk of sheet material having a handle means connected thereto at a position opposite from said U-shaped hinge means.

10. The solar powered oven of claim 9, wherein said handle means comprises a U-shaped hinge capable of engagement with said hinge pin.

11. The solar powered oven of claim 7, wherein said reflector means comprises:
 a plurality of at least four reflector panels; and
 a hinge rod assembly having a separate hinge rod corresponding to each of said plurality of reflector panels, each rod carrying its respective reflector panel in hinged relationship, and having anchor means associated with each end of each hinge rod and joining each rod end to an end of another rod of the assembly to form a closed geometric figure independent of the cover assembly for connecting said hinge rod assembly to the cover assembly.

12. The solar powered oven of claim 11, wherein said alignment indicating means comprises a rigid cross member connected to at least four of said reflector panels in opposite pairs for structurally spacing and maintaining said panels in operative position, and wherein said cross member includes a central intersection of cross member components, said intersection being substantially equidistant from each of said four reflector panels and spaced above said cover assembly for casting an aligning shadow on the cover assembly.

* * * * *